United States Patent
Langkafel et al.

(10) Patent No.: US 7,802,235 B2
(45) Date of Patent: Sep. 21, 2010

(54) SYSTEM AND METHOD FOR TRACING AND/OR EVALUATING THE EXCHANGE OF INFORMATION

(75) Inventors: Dirk Langkafel, Erlangen (DE); Thomas Merkl, Kemnath (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 941 days.

(21) Appl. No.: 10/497,774

(22) PCT Filed: Nov. 28, 2002

(86) PCT No.: PCT/DE02/04382

§ 371 (c)(1),
(2), (4) Date: Jun. 3, 2004

(87) PCT Pub. No.: WO03/050676

PCT Pub. Date: Jun. 19, 2003

(65) Prior Publication Data

US 2005/0015741 A1    Jan. 20, 2005

(30) Foreign Application Priority Data

Dec. 12, 2001 (DE) .............................. 101 61 140

(51) Int. Cl.
*G06F 9/44* (2006.01)
(52) U.S. Cl. ................. 717/128; 717/101; 717/127
(58) Field of Classification Search ................. 717/128, 717/101, 127
See application file for complete search history.

(56) References Cited

U.S. PATENT DOCUMENTS

| | | | | |
|---|---|---|---|---|
| 5,371,746 | A * | 12/1994 | Yamashita et al. | 714/38 |
| 6,083,281 | A | 7/2000 | Diec et al. | |
| 6,106,569 | A * | 8/2000 | Bohrer et al. | 717/100 |
| 6,202,099 | B1 * | 3/2001 | Gillies et al. | 719/317 |
| 6,446,136 | B1 * | 9/2002 | Pohlmann et al. | 719/318 |
| 6,556,950 | B1 * | 4/2003 | Schwenke et al. | 702/183 |
| 6,584,491 | B1 * | 6/2003 | Niemi et al. | 709/202 |

(Continued)

FOREIGN PATENT DOCUMENTS

WO    WO 00/39674    7/2000

OTHER PUBLICATIONS

Eila Niemelä and Mikko Holappa, "Experiences with the Use of COBRA", Euromicro Conference, 1998. Proceedings 27th Vasteras, Sweden Aug. 25-27, 1998, Los Alamito, CA, USA, IEEE Comput. Socl, US, Aug. 25, 1998, pp. 989-996.

(Continued)

*Primary Examiner*—Lewis A Bullock, Jr.
*Assistant Examiner*—Michael Yaary

(57) ABSTRACT

The invention relates to a system and a method for tracing and evaluating the communication of software applications, especially MES applications in an entire system. The tracing and evaluation can be carried out progressively or step-by-step on a project level, an adapter level and a port level, i.e. individual communication connections and individual applications, but the entire project is also traced by (even heterogeneous) application environments. The tracing and evaluation mechanisms enable higher-level services to access online the archived trace and error data at all times. An example of one such service is the generation of a report in the pharmaceutical field, indicating the materials used and sent in production orders.

17 Claims, 10 Drawing Sheets

U.S. PATENT DOCUMENTS

| | | | | |
|---|---|---|---|---|
| 7,133,820 | B2* | 11/2006 | Pennello et al. | 703/22 |
| 2001/0009033 | A1* | 7/2001 | Morisaki et al. | 717/1 |
| 2002/0144256 | A1* | 10/2002 | Budhiraja et al. | 717/174 |
| 2003/0172371 | A1* | 9/2003 | Offenmuller | 717/120 |
| 2004/0003091 | A1* | 1/2004 | Coulthard et al. | 709/227 |

OTHER PUBLICATIONS

Mesa International, "MES Explained: A High Level Vision", MESA International, White Paper No. 6, Sep. 1997, pp. 1-24, Pittsburgh, PA, USA.

Christopher Kurt, "BizTalk and the Open Applications Group Implementing OAGIS within the Microsoft BizTalk Framework", Jun. 14, 2000, Microsoft Corp. 2000, pp. 1-7.

Dirk Kozian, "Transparenz über die Abläufee schaffen", Elektrotechnik für die Automatisierung, Nov. 11-17, 1999, pp. 66-69.

Ulrich Lindner, "Massive Wiederverwendung: Konzepte, Techniken und Organisation", OBJECTspektrum Jan. 1996, Germany, Jan. 1996, pp. 10-17.

ATG Dynamo 5 DCS Java API: "Class Monitored Connection", Oct. 7, 2002, pp. 1-12.

Art Technology Group, "ATG Dynamo 5, Version 5.1, Overview", Nov. 21, 2000, Cambridge, MA, USA, pp. i-iv and 1-4.

Paul Kulchenko, "Quick Start with SOAP", O'Reilly's & Associates, Inc., Jan. 29, 2001, pp. 1-12.

Ehab Al-Shaer, Mohamed Fayad, Hussein Abdel-Wahab and Kurt Maly, "Adaptive Object-Oriented Filtering Framework for Event Management Applications", ACM Computer Surveys, Mar. 2000, pp. 1-6.

IBM, "IBM MQSeries Adapter Offering Expands MQSeries Adapter Kernel Platform Support and Introduces a New Adapter Builder Tool", Programming Announcement, Oct. 3, 2000, pp. 1-3.

USDATA, "XFactory, A Manufacturing Execution Software", USDATA Corp. Online, Jul. 14, 2001, p. 1.

* cited by examiner

SYSTEM AND METHOD FOR TRACING AND/OR EVALUATING THE EXCHANGE OF INFORMATION

CROSS REFERENCE TO RELATED APPLICATIONS

This application is the US National Stage of International Application No. PCT/DE02/04382, filed Nov. 28, 2002 and claims the benefit thereof. The International Application claims the benefits of German application No. 10161140.4 filed Dec. 12, 2001, both of the applications are incorporated by reference herein in their entirety.

FIELD OF INVENTION

The invention relates to a system and method for tracing and/or evaluating the exchange of information between heterogeneous software applications in particular, in particular MES applications, in a software system linking the software applications, whereby the software applications and the software system are stored on at least one computer unit.

The invention also relates to a corresponding computer program, a computer program product and a data processing device.

BACKGROUND OF INVENTION

From "Software für die Automatisierung—Transparenz über die Abläufe schaffen" (Software for automation—Creating process transparency), an article by Dirk Kozian in Elektronik für Automatisierung (Automation Electronics) 11, 17, 11, 1999, it is known that what are known as Manufacturing Execution Systems (MES) can be used to automate production and manufacturing processes. These systems integrate the automation level or controls with the corporate-level ERP systems (ERP: Enterprise Resource Planning). Manufacturing Execution Systems are systems, which for example supply information for optimizing production processes. On the one hand the Manufacturing Execution Systems have to extend the general planning data of the ERP systems to include unit-specific and up-to-date detailed planning data and forward this correspondingly to the lower-level automation level and on the other hand they have the task of extracting production-relevant information from the automation level, processing this and forwarding it to the corporate level. MES systems thereby perform the role of vertical integration between corporate level and automation level. Typical individual tasks of MES systems are Enterprise Asset Management, Maintenance Management, Information Management, Scheduling, Dispatching and Trace & Track. These tasks are executed by MES components and MES applications respectively.

The heterogeneity of the MES applications in respect of software and data technology means that these are however very difficult to integrate into a shared system or project and the exchange of data between said applications cannot be easily achieved.

From "Massive Wiederverwendung: Konzepte, Techniken und Organisation" (Mass recycling: concepts, methods and organization), an article by Ulrich Lindner in OBJEKTspektrum 1/96, pages 10-17, it is known that software components can be integrated into a software system by means of what are known as adapters or by wrapping. The objective here is to increase the recyclability of software components.

In complex systems, such as MES systems, it is very difficult to trace and verify the exchange of information between the components involved.

In U.S. Pat. No. 6,083,281 a method is described for tracing the activities of entities in software systems. However this method relates to the mode of operation of the entities and not the exchange of data between the entities. This method is intended to be of assistance to software developers in the development and test phases.

Also an event-log mechanism and an event display are known from the Microsoft Windows NT operating system.

SUMMARY OF INVENTION

The object of the present invention is to provide a system and a method for tracing, evaluating and logging the communication of software components, in particular in MES systems.

According to the invention the abovementioned object for a system is achieved by means of the features of Claim 1. One important advantage of the invention is the simple and automatic verification of the exchange of data. It can be ascertained whether specified information has actually been exchanged. In other words it can be verified whether information has actually been sent by a sender and has reached the recipient. Also transmission errors or bottlenecks that occur can be identified and analyzed very easily. Optimization options for the underlying software system or project can thereby be derived. A further advantage is that mandatory records for the authorities e.g. FDA can very easily be kept (e.g. by means of generated reports).

In a first advantageous embodiment of the present invention for a system, the results of the analysis of the exchange of information and/or the error analysis can be further processed directly by the software system. The results of the analysis and the derived conclusions (e.g. optimization options) can be taken into account directly in the software system (e.g. modified component configuration, dimensioning or arrangement of communication connections). This results in a quasi-closed self-regulating control loop.

In a further advantageous embodiment of the present invention for a system, specific information and/or errors can be selected by creating a filter. Users can thereby access information in a targeted manner very easily. Possible filters are for example, sender, recipient, time period, message IDs. The filters can be defined for example by means of input masks and input tools (keyboard, mouse, etc.). The user then has the option of procuring information in a progressive and dedicated manner.

In a further advantageous embodiment of the present invention for a system, tracing and/or evaluation is carried out at project level or at adapter level or at the level of an information channel. This allows progressive information procurement and evaluation at different abstraction levels (project level, adapter level, port level).

In a further advantageous embodiment of the present invention for a system, adapters and/or wrappers are deployed as the link mechanisms. Adapter and wrapper technologies are known mechanisms in information technology for integrating software components into a system. A wrapper maps the API (Application Programmable Interface) of an external component (e.g. a MES application of a third-party provider) onto the object model of the framework program. Thus for example a framework program method is obtained from a method of the API of the external component or an integer data type of the framework program is obtained from an integer data type of the API of the external component, etc. For COM (Component Object Model) objects, creation of a wrapper for a component to be integrated can be automated. A wrapper corresponds to a bridge. Wrappers can be produced very quickly.

Adapters are one abstraction level higher than wrappers. They provide a uniform view of linked applications. An adapter offers the functionality to start, control, etc. the component to be linked. In the language of design patterns an adapter corresponds to a facade.

In a further advantageous embodiment of the present invention for a system, the first and second devices are supplied by one device or the first, second and fourth devices are supplied by one device or the first and fourth devices are supplied by one device or the second and fourth devices are supplied by one device. This allows a compact structure that minimizes resources (e.g. less storage capacity required).

In a further advantageous embodiment of the present invention for a system, the third device is integrated into one of the other devices. This also allows a compact structure that minimizes resources (e.g. less storage capacity required). Also the time required to access database content can be optimized as a result.

According to the invention the abovementioned object for a method is achieved by means of the features of Claim 8. One important advantage of the invention is the simple and automatic verification of the data exchange. It can be ascertained whether specified information has actually been exchanged. In other words it can be ascertained whether information has actually been sent by a sender and has reached the recipient. Also transmission errors or bottlenecks that occur can be identified and analyzed very easily. Optimization options for the underlying software system or project can thereby be derived. A further advantage is that mandatory records for the authorities e.g. FDA can very easily be kept (e.g. by means of generated reports).

In a first advantageous embodiment of the present invention for a method, the results of the analysis of the exchange of information and/or the error analysis can be further processed directly by the software system. The results of the analysis and the derived conclusions (e.g. optimization options) can be taken into account directly in the software system (e.g. modified component configuration, dimensioning or arrangement of communication connections). This results in a quasi-closed self-regulating control loop.

In a further advantageous embodiment of the present invention for a method, specific information and/or errors can be selected by creating a filter. Users can thereby access information in a targeted manner very easily. Possible filters are for example, sender, recipient, time period, message IDs. The filters can be defined for example by means of input masks and input tools (keyboard, mouse, etc.). The user then has the option of procuring information in a progressive and dedicated manner.

In a further advantageous embodiment of the present invention for a method, tracing and/or evaluation is carried out at project level or at adapter level or at the level of an information channel. This allows progressive information procurement and evaluation at different abstraction levels (project level, adapter level, port level).

In a further advantageous embodiment of the present invention for a method, adapters and/or wrappers are deployed as the link mechanisms. Adapter and wrapper technologies are known mechanisms in information technology for integrating software components into a system. A wrapper maps the API (Application Programmable Interface) of an external component (e.g. a MES application of a third-party provider) onto the object model of the framework program. Thus for example a framework program method is obtained from a method of the API of the external component or an integer data type of the framework program is obtained from an integer data type of the API of the external component, etc. For COM (Component Object Model) objects, creation of a wrapper for a component to be integrated can be automated. A wrapper corresponds to a bridge. Wrappers can be produced very quickly.

Adapters are one abstraction level higher than wrappers. They provide a uniform view of linked applications. An adapter offers the functionality to start, control, etc. the component to be linked. In the language of design patterns an adapter corresponds to a facade.

In a further advantageous embodiment of the present invention for a method, the first and second devices are supplied by one device or the first, second and fourth devices are supplied by one device or the first and fourth devices are supplied by one device or the second and fourth devices are supplied by one device. This allows a compact structure that minimizes resources (e.g. less storage capacity required).

In a further advantageous embodiment of the present invention for a method, the third device is integrated into one of the other devices. This also allows a compact structure that minimizes resources (e.g. less storage capacity required). Also the time required to access database content can be optimized as a result.

In a further advantageous embodiment of the present invention the inventive method is implemented by a computer program. This allows any modifications or amendments to be effected easily.

In a further advantageous embodiment of the present invention the computer program for the inventive method is stored on a data medium. This means that the method is easy to manage in respect of logistics and distribution.

In a further advantageous embodiment of the present invention, the computer program for the inventive method is installed on a data processing device. This enhances its performance.

BRIEF DESCRIPTION OF THE DRAWINGS

Further advantages and details of the invention will emerge from the description which follows of advantageous exemplary embodiments and in conjunction with the figures. Elements with the same functionality described in different figures are shown with the same reference characters.

DETAILED DESCRIPTION OF INVENTION

Figure 1:
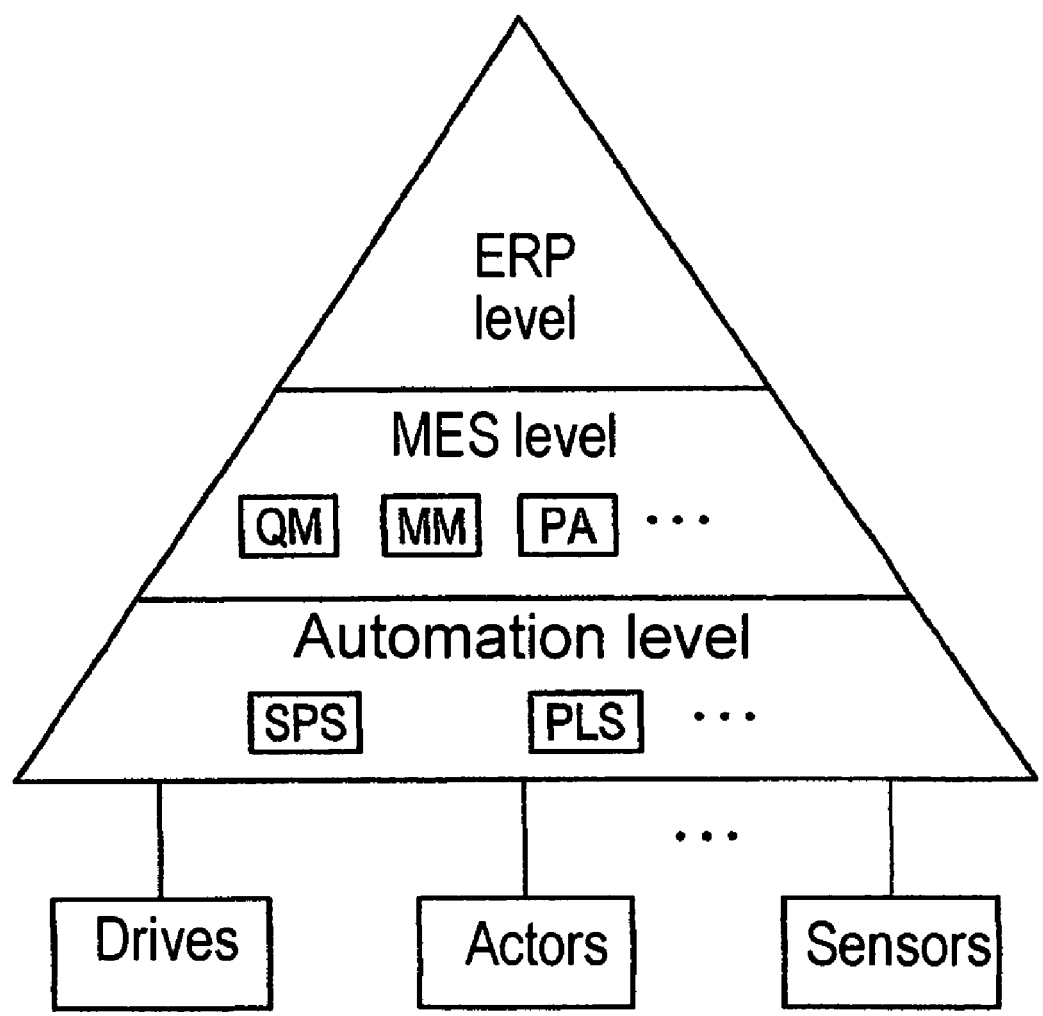
FIG. 1 shows an overview of the "corporate pyramid" with three control levels.

The representation according to FIG. 1 shows an overview of the three control levels, as generally found in a production or manufacturing company. The pyramid form shows that information is compressed upwards. The top level is the ERP (Enterprise Resource Planning) level. The business administration and sales tasks are generally carried out at this corporate level in a company (e.g. finance, sales, human resources, reporting). However logistics tasks relating to all the production units (e.g. order and materials management) are also carried out at this level. The SAP R/3 system is an ERP system that is very frequently used at corporate level.

The lowest level of the pyramid is automation level (controls). Stored program controls (SPS) are generally deployed at this level in conjunction with visualization and process control systems (PLS). The drive units, actuators and sensors of the production and/or manufacturing devices are directly connected to the systems of this level.

The connecting element between ERP level and automation level is formed by MES level. MES level applications thereby ensure vertical integration between ERP level and automation level. On the one hand MES applications have to extend the general planning of the ERP systems to include detailed planning that is production unit specific and forward this to the automation level systems and on the other hand the task of the MES applications is to extract production-relevant data from the automation level, process this and forward it to ERP level (corporate level).

Typical MES applications are for example Quality Management (QM), Maintenance Management (MM), Performance Analysis (PA), Process Management, Labor Management, Asset Management. The three dots in each instance in FIG. 1 show that there may be further elements (applications, systems, etc.) at a level.

MES systems or ERP systems generally contain what is known as a runtime system for temporal process control of the components involved (subcomponents, modules, tasks, operating system processes, etc.) and what is known as an engineering system to produce and edit programs, which are provided for execution in the runtime system.

Figure 2:
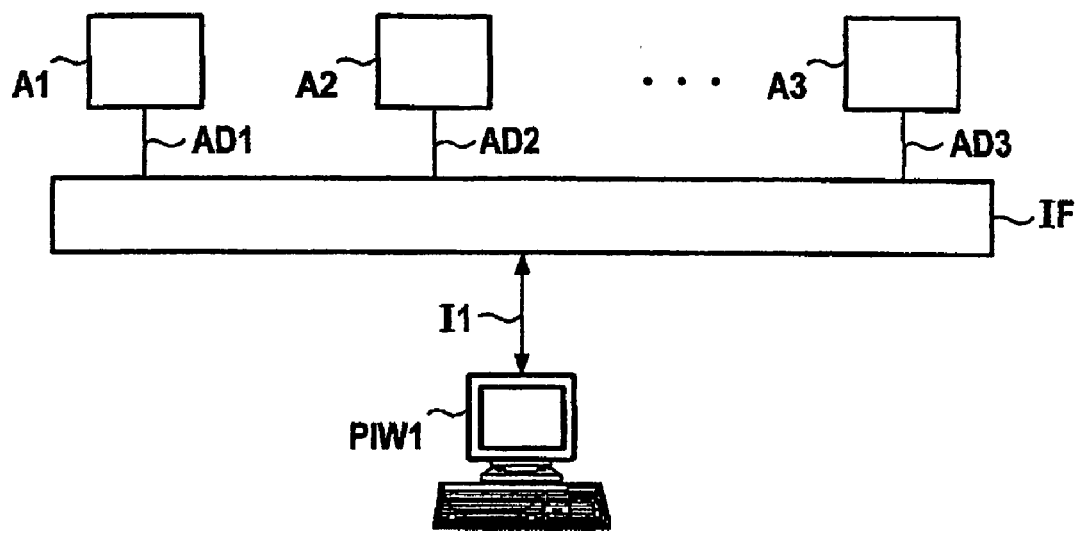
FIG. 2 shows an exemplary overview with software and hardware units for MES solutions.

The representation according to FIG. 2 shows an exemplary overview with software and hardware units for MES solutions. The individual MES applications A1 to A3 are connected via adapters AD1 to AD3 to a framework program IF. A user workplace PIW1 is linked via a bi-directional information path I1 to the framework program IF and can thereby manage and monitor the appended or integrated MES applications. The user workplace PIW1 generally comprises a display device (monitor, display, etc.), a data processing unit (e.g. PC) with processor and storage devices and input units (keyboard, mouse, etc.). The MES applications A1 to A3 and the framework program IF can run on their own specific data processing units or processors but it is also possible for them to run on the data processing unit of the PIW1.

The respective MES applications A1 to A3 are connected to the framework program IF via adapters AD1 to AD3. The adapters are therefore the link modules between the framework program IF and the applications. Applications that are heterogeneous per se can be connected together via the adapters and integration with the framework program IF means that it is possible to communicate between the applications and to operate an exchange of data. The adapters are software modules, which provide connections to different applications. In typical integration scenarios this means integration into systems from the MES, ERP, SCADA or controls worlds. An adapter offers the functionality to start, control, etc. a component to be linked. An adapter allows access to data and functions of the application to linked, provides specific runtime data and allows the loading of engineering information from the application to be linked. Adapters can differ in respect of structure and scope. Adapters can therefore be programmed in a fixed manner or they can be configured or modeled. They can also differ with regard to the possibilities for accessing the application to be linked. Adapters may therefore only permit access for data-related purposes but it is also possible for adapters to allow access to higher-order business processes. During start-up the adapters are loaded with the stored models and status information. In runtime it is verified whether and how the different integrated applications match up. A visualization or monitoring component can be used to request the status of an adapter and display it (even graphically) at the user workplace PIW1. Adapters allow the system and the user to have a standardized and uniform view of applications (depending on the abstraction level at the adapters).

A further option for integrating software components is to deploy wrappers. A wrapper maps the API (Application Programmable Interface) of an external component (e.g. a MES application) onto the object model of the framework program. In this way a method of the framework program is obtained from a method of the API of the external component or an integer data type of the framework program is obtained from an integer data type of the API of the external component.

As well as MES applications, applications from corporate level (Enterprise Resource Planning level) and from automation level (controls level) can also be integrated via the framework program IF and monitored and managed via the workplace PIW1 (the acronym PIW stands for Personalized Industrial Workplace). The framework program IF thereby creates an integration platform for the entire industrial area. Different applications from corporate level, MES level and automation level can be integrated simply and economically by the framework program IF using adapters and/or wrappers. The framework program IF should therefore be seen as a middleware platform and a Manufacturing Application Integration tool. A user (e.g. the unit operator) can see the respective statuses of the applications to be monitored via the workplace PIW1 and can access data and application methods and can also connect applications by means of said access.

The framework program IF thereby on the one hand allows vertical integration of applications from different company levels to be achieved and on the other hand the framework program IF allows the horizontal integration of MES level applications.

The workplace PIW1 represents "one window to the world" for users at the front end of MES applications or other applications from the company. In other words the workplace allows integrative access to different, even heterogeneous applications within the company via a shared standard surface. The user of the workplace PIW1 can therefore monitor and manage all integrated MES or other applications from this one workplace. This workplace can be connected to the applications via the internet, the intranet, LAN (Local Area Network) or other possible connections. It is also possible to configure said workplace as a mobile station, e.g. as a mobile terminal (PDA, mobile phone). Such mobility can offer the user further advantages.

Figure 3:
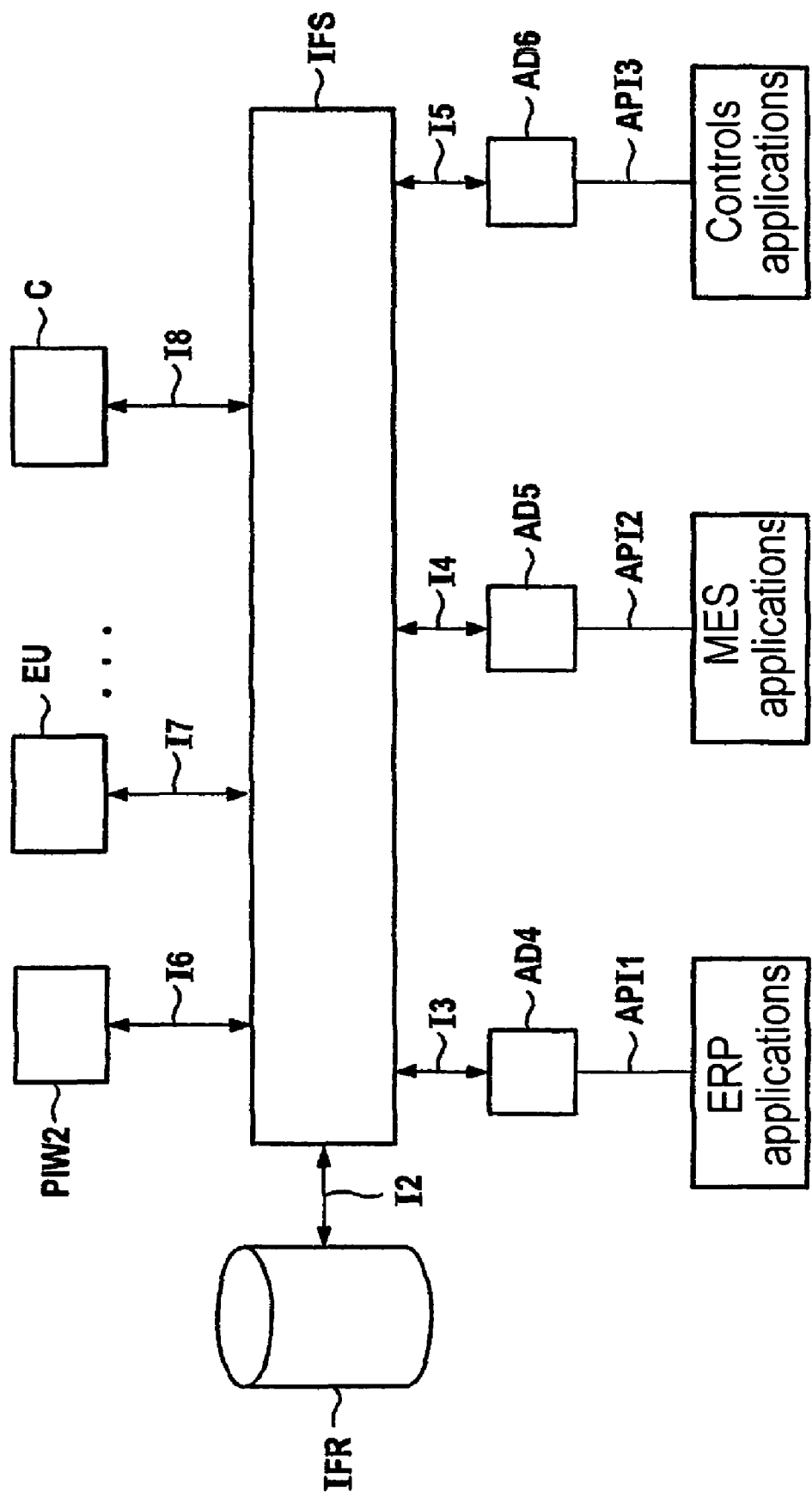
FIG. 3 shows the central position of the framework program linking the software applications.

The representation according to FIG. 3 shows the central position of the framework program linking the software applications. In order to set up the inventive system or method, it is recommended that a client-server architecture should be selected. The framework program (IF; FIG. 2) can thereby be set up on a single server or on a plurality of any servers, which can be distributed in an IT environment. FIG. 3 shows the framework program (IF; FIG. 2) on a server IFS (Industrial Framework Server). The clients are appended to this central server IFS, connected by the bi-directional information paths 12-18. The clients include on the one hand the applications from ERP, MES and automation levels. FIG. 3 shows these applications at the bottom edge of the image. These applications are connected to the framework program (IF; FIG. 2) and therefore the server IFS via the adapters AD4-AD6. The connection between the adapters AD4-AD 6 and the applications is effected via API interfaces API1-API3 (API stands for Application Programmable Interface). An application programmable interface represents an interface with a quantity of commands. APIs are also used when converting parameter lists from one format to another format and when interpreting arguments in one or both directions. APIs as it were represent the glue between the applications and adapters. The connection between the adapters AD4-AD6 and the framework program (IF; FIG. 2) (shown in FIG. 3 by the bi-directional information paths I3-I5) is effected via appropriate data formats (e.g. XML), appropriate protocols (XOP, OPC, etc.) and appropriate transport mechanisms (e.g. DCOM or MSMQ). HTTP (Hyper Text Transfer Protocol) can also be used here. Also the protocol SOAP (Simple Object Access Protocol) based on XML (extensible Markup Language) can be used for integration of the adapters AD4-AD6 into the framework program (IF; FIG. 2) or the associated server IFS. Clients or applications, which support ActiveX documents or calls, can be particularly advantageously integrated into the framework program (IF; FIG. 2) or the server IFS. Applications can be linked to the framework program by wrappers or other integration mechanisms, as well as adapters.

The repository IFR (Industrial Framework Repository) can be connected to the server IFS as a further client. FIG. 3 shows the connection by means of the bi-directional information path I2. The repository IFR is used to hold data in a secure and persistent manner. This data can be accessed via method calls. Objects, methods and runtime data for example are stored in the repository.

Further clients of the server IFS are shown in the top half of the image. The Personalized Industrial Workplace PIW2 and any engineering environment EU are clients of the server IFS. The Personalized Industrial Workplace PIW2 is connected by means of the bi-directional information path I6 to the framework program (IF; FIG. 2) or the server, the engineering environment EU is connected correspondingly by means of the bi-directional information path I7. The three dots indicate that further clients can be appended to the server IFS. FIG. 3 shows that a further client C is appended to the server IFS as well, connected by the information path I8.

The clients IFR, PIW2, EU, C are connected correspondingly via APIs or via standard data formats (e.g. XML), standard protocols (XOP, OPC, etc.) and standard transport mechanisms (e.g. DCOM, HTTP or MSMQ).

The deployed adapters AD4-AD6 allow access to data and also to methods of the individual applications, which connect them to the framework program (IF; FIG. 2). These adapters are very flexible and not tied to individual specific protocols or specific transport mechanisms. If the adapters are deployed in a runtime environment, they are configured so that it is ensured that specific necessary data from an application is available at the correct time in the server environment. As already stated, this can take place via different protocols and transport mechanisms. In a runtime environment there can be a plurality of adapters, which can also possess minor server characteristics (such as for example the execution of workflows, the provision of different communication options, etc.). These adapters can run on the respective application computers. They do not however have to run on one machine only but can also be distributed.

Software applications, in particular MES (Manufacturing Execution Systems) applications are often present in a heterogeneous form, e.g. they can have different data formats or object models or they are set up in different programming languages. The inventive system or method allows such heterogeneous applications to be integrated using a framework program. Communication between these applications takes place on the basis of communication means such as for example HTTP, DCOM, MSMQ, etc. Communication, i.e. the exchange of data between the applications, is however independent of said communication means, i.e. the applications can abstract from the application means.

Figure 4:
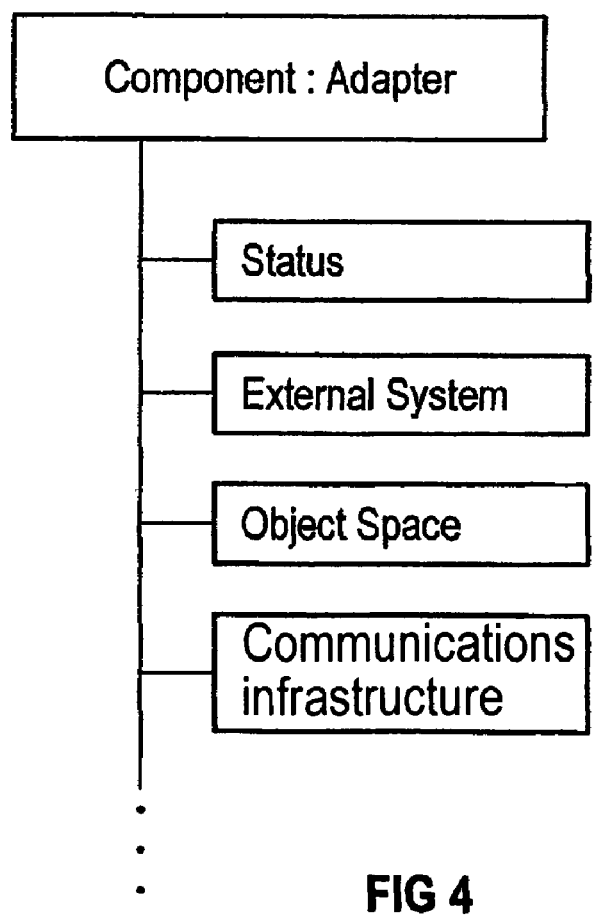
FIG. 4 shows the principles of the structure of an adapter.

The representation according to FIG. 4 shows the principles of the structure of an adapter. Each adapter is a specific component (the component as a meta-object model is explained in more detail in FIG. 11) with the particular characteristic that the component of an adapter in each instance operates in its own specific process. Each adapter has a specific default structure, which is shown as a tree structure of objects of the framework program, i.e. components and variables, and which provides specific points, at which the adapter can output specific information. Examples of this are status information about the status of the adapter (is the adapter connected to its application, is the application running, version information, etc.). An adapter can also output information about the external system, i.e. the external application. An adapter can use the object space to output structures, which other adapters or other applications can access. An adapter can also output information relating to a communication infrastructure. The term communication infrastructure refers to objects for sending messages, receiving messages and transforming messages. It also refers to mechanisms for routing and mechanisms for logging the adapter's data exchange. The communication infrastructure of an adapter also includes what are known as in-ports and out-ports, which physically receive or send messages. An adapter exists as a specific process of the operating system, i.e. if one adapter crashes, it has no impact on other adapters. An adapter is therefore a specific, closed application, which can be executed alone.

Adapters and wrappers are mechanisms for integrating software components into a software system. A wrapper maps the API (Application Programmable Interface) of an external component or an application to be integrated onto the object model of the software system, in this case the framework program (IF; FIG. 2). This means that a method of the framework program is obtained for example from a method of the API of the application to be integrated or an integer data type of the framework program is obtained from an integer data type of the API of the application to be integrated, etc. A wrapper thereby converts the API of the application to be integrated to the language, the nomenclature and object world of the framework program.

An adapter on the other hand is one abstraction stage higher than a wrapper. Adapters provide a standardized view of applications to be integrated and the framework program, into which the application to be integrated is mounted, can abstract from said application. An adapter provides functionality to start, control and process the system to be integrated, i.e. the application to be integrated. A user can for example use the adapter to utilize a SAP application without being a SAP expert. IDOC adapters are used to map SAP applications onto the objet model of the framework program and said applications then become objects of the framework program (component IDOC).

The inventive system and method allow two applications (e.g. MES applications) to be combined peer-to-peer, without such a connection having to be programmed peer-to-peer in each instance. These connections are projected according to the invention by establishing a connection (see FIG. 13).

Figure 6:
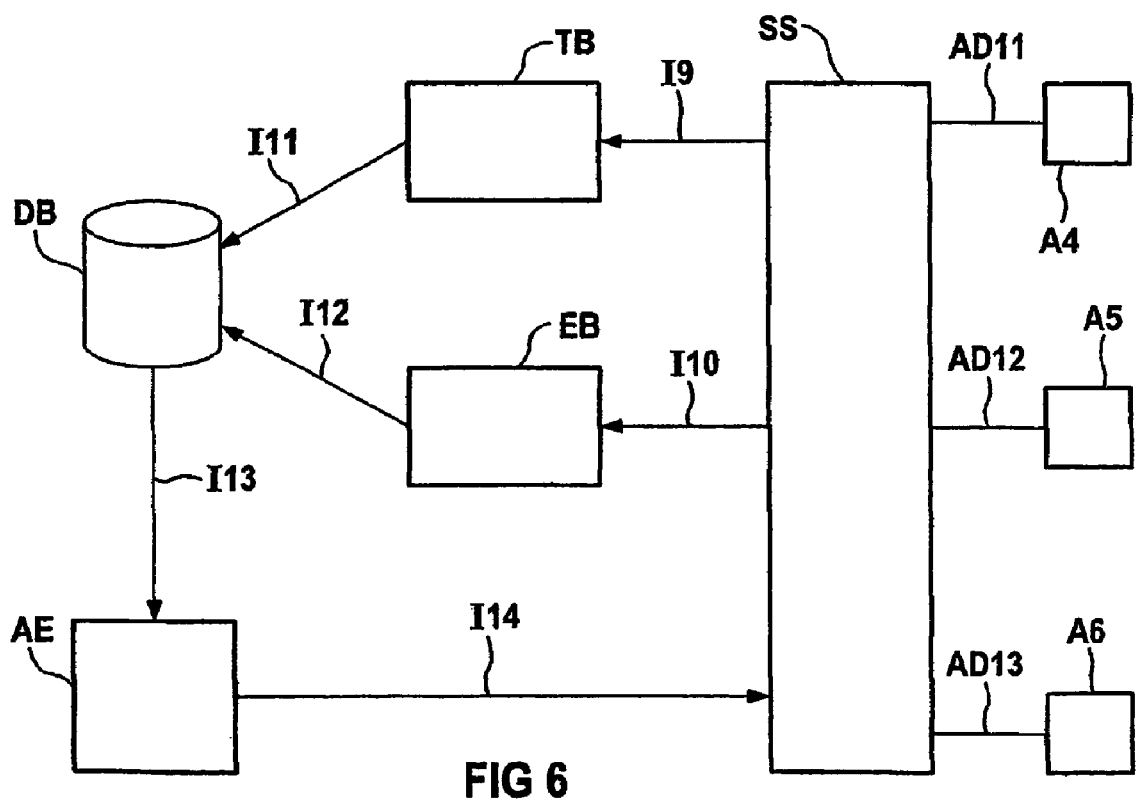
FIG. 6 shows a functional representation of the principles of the invention.

Trace boxes (TB; FIG. 6) and error boxes (EB; FIG. 6) can already be available in the default structure of the adapters as mechanisms for collecting information relating to the adapter.

Figure 5:
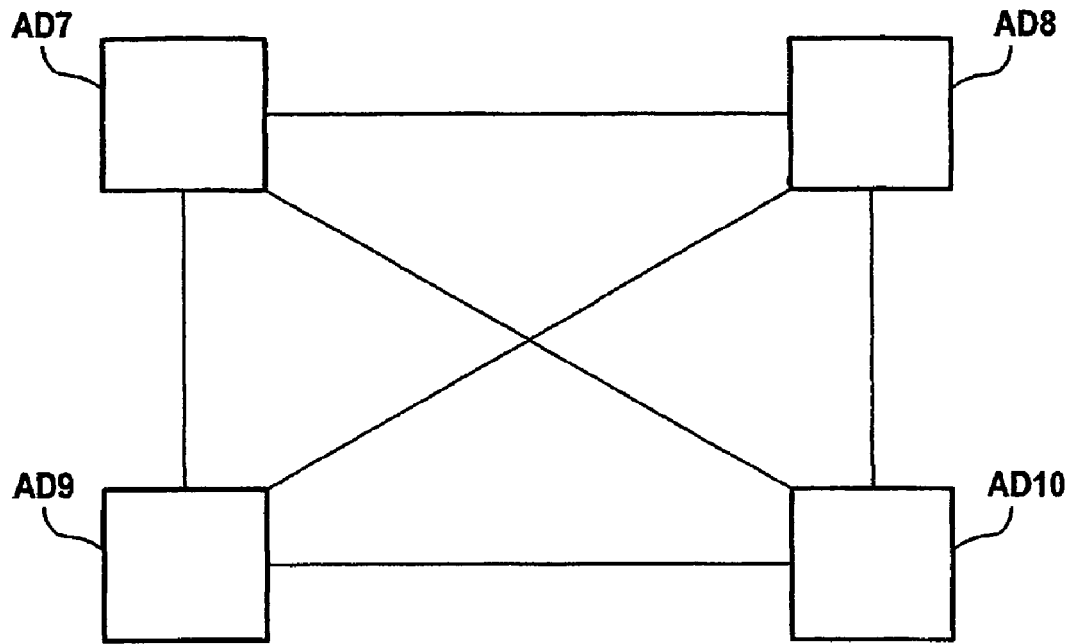
FIG. 5 shows a plurality of switched adapters.

The representation according to FIG. 5 shows a plurality of switched adapters AD7 to AD10. The adapters are shown as rectangles, the switching connection is shown by connecting lines. Software applications, e.g. MES applications, are integrated together by means of adapters. If there is no linking software system (e.g. a framework), into which each adapter is integrated, the complexity and cost of integrating the adapters increase very significantly.

The representation according to FIG. 6 shows a functional representation of the principles of the invention. Software applications A4 to A6 are connected to the linking software system SS or integrated into the software system SS by means of the adapters AD11 to AD13 respectively. The inventive object allows the tracing and evaluation of communication in the software system SS and the applications A4 to A6 integrated in the software system at different levels.

On the one hand the tracing and evaluation of communication take place at port level. The logical connection point between an adapter and a connection (see FIG. 12 and FIG. 13) is what is known as a port. A port is the point, at which information or messages enter an adapter or leave an adapter.

The second stage of tracing and evaluation of communication takes place at adapter level. A plurality of ports and connection can be appended to one adapter.

The third stage of tracing and evaluation of communication takes place project-wide. A project, e.g. a MES project, contains a plurality of applications or MES applications. During tracing and evaluation of communication at project level the entire exchange of messages of all applications involved in the project is traced.

There are trace boxes TB and error boxes EB at each of these levels. A trace box TB is used to collect ongoing messages, while an error box EB is used to collect messages, which could not be delivered or in which errors occurred as they were being forwarded.

These messages reach the trace box TP or error box EB via the information paths 19 or I10. The messages collected by the trace box TP or error box EB are stored in the repository DB via the information paths I11 or I12. A user can access the information stored in the repository BD in a dedicated manner via the definition of filter conditions. Possible filter conditions are for example where a user only wishes to see messages from defined senders or defined recipients. It is however also possible only to have the messages from a defined time period displayed. This applies to messages from the trace box TP and the error box EB.

The data from the repository DB can however also be used for evaluation and diagnosis purposes. FIG. 6 shows that an evaluation device AE is supplied with data via the information path I13. Evaluations, statistics, data compressions and also reports can now be produced via this evaluation device AE. Such reports are in particular useful for the mandatory records for the authorities or departments, as it can be proven that only specific information has flowed and if the system or unit malfunctions, internal blame can demonstrably be excluded. This is of particular interest in the pharmaceutical field (FDA documentation lists). The evaluations can however also be used for example to identify bottlenecks and implement specific optimization measures. These findings can be input from the evaluation unit AE directly back into the software system SS. In FIG. 6 this is shown by the information path I14. The inventive system or method can therefore also be seen in the widest sense as a field-regulating control loop.

Figure 7:
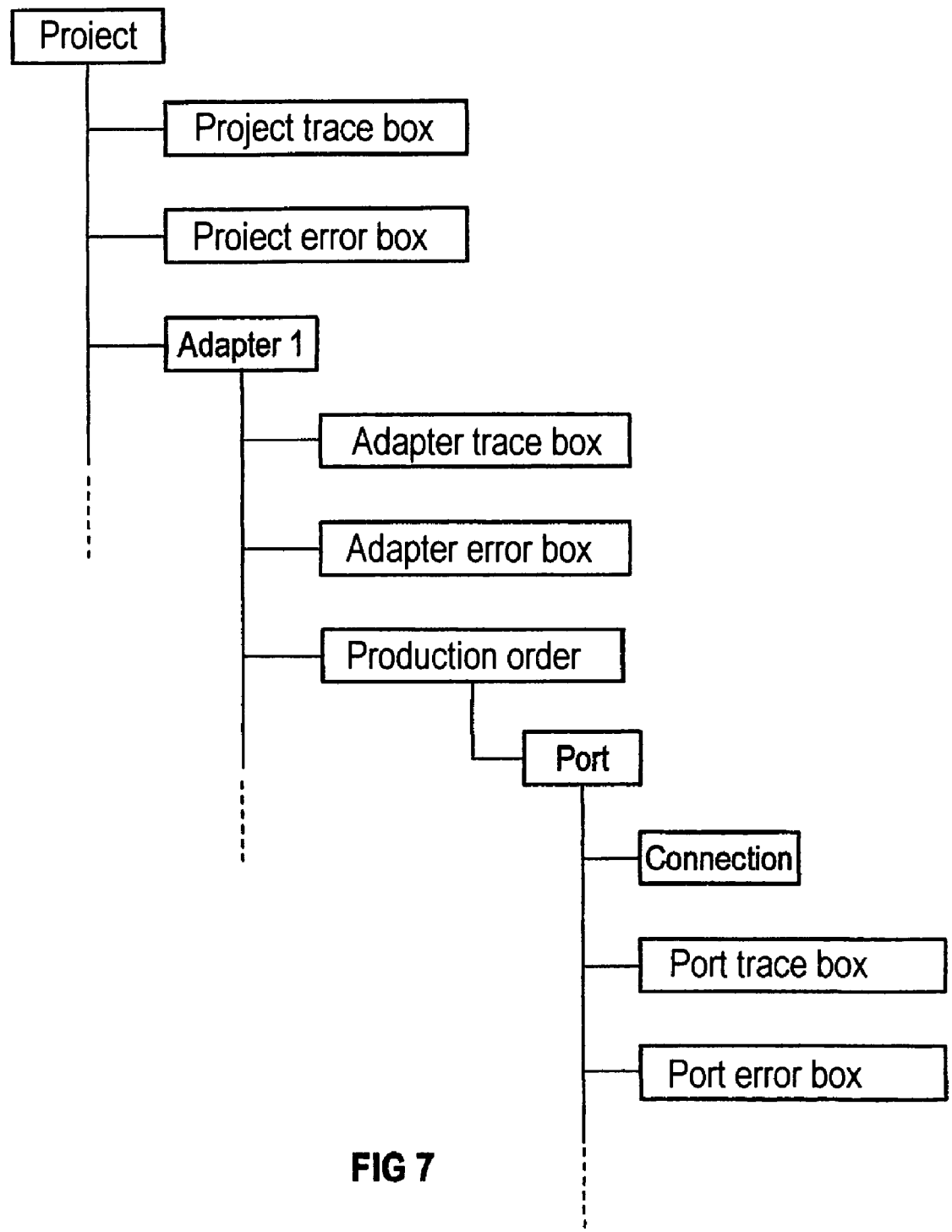
FIG. 7 shows a diagram of project entities.

The representation according to FIG. 7 shows a diagram of the entities of a project, e.g. a MES project. The tracing and evaluation of the communication of applications, in particular MES applications, can be carried out at project level, adapter level or at port level. There is therefore a project trace box and error box respectively, there is an adapter trace box and error box respectively for each adapter and there is also a port trace box and error box respectively for each port. The trace boxes are used to collect ongoing messages, while the error boxes are used to collect messages which could not be delivered or in which errors occurred when they were being forwarded. A plurality of applications can be used for a project. Each application is generally integrated into the project via an adapter. Each adapter has its own adapter trace box or its own adapter error box. Each port also has its own port trace box or its own port error box. The task of a port is to act as an interceptor. A port is part of an underlying communication system and not part of an adapter or the adapted application.

A port can have a plurality of connections (see FIG. 12 and FIG. 13) and an adapter can have a plurality of ports. A port is the point, at which the data concerning the connection logically enters or leaves an adapter.

Ports are appended for example to variables, which they provide with information or values. In FIG. 7 the port shown is appended to the production order variable. This production order variable belongs to the adapter 1. The trace boxes and error boxes for adapters can already be present in the default structure of an adapter.

In FIG. 7 the broken 4 ends of the vertical lines show that a project, an adapter or a port can also contain further objects or elements in addition to the objects shown.

Figure 8:
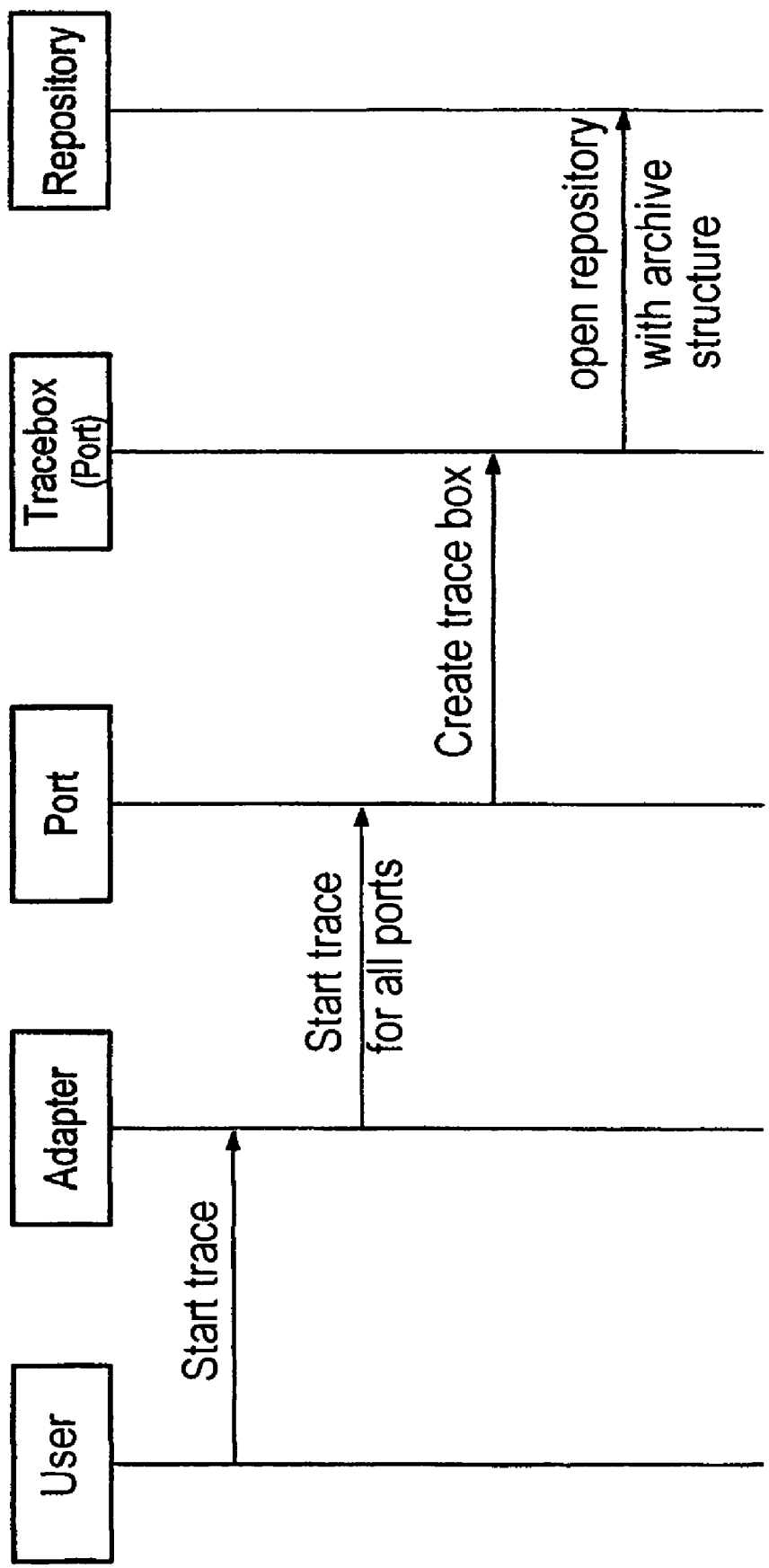
FIG. 8 shows a sequence chart: initialization.

The representation according to FIG. 8 shows a sequence chart for initialization of tracing and evaluation mode.

Figure 9:
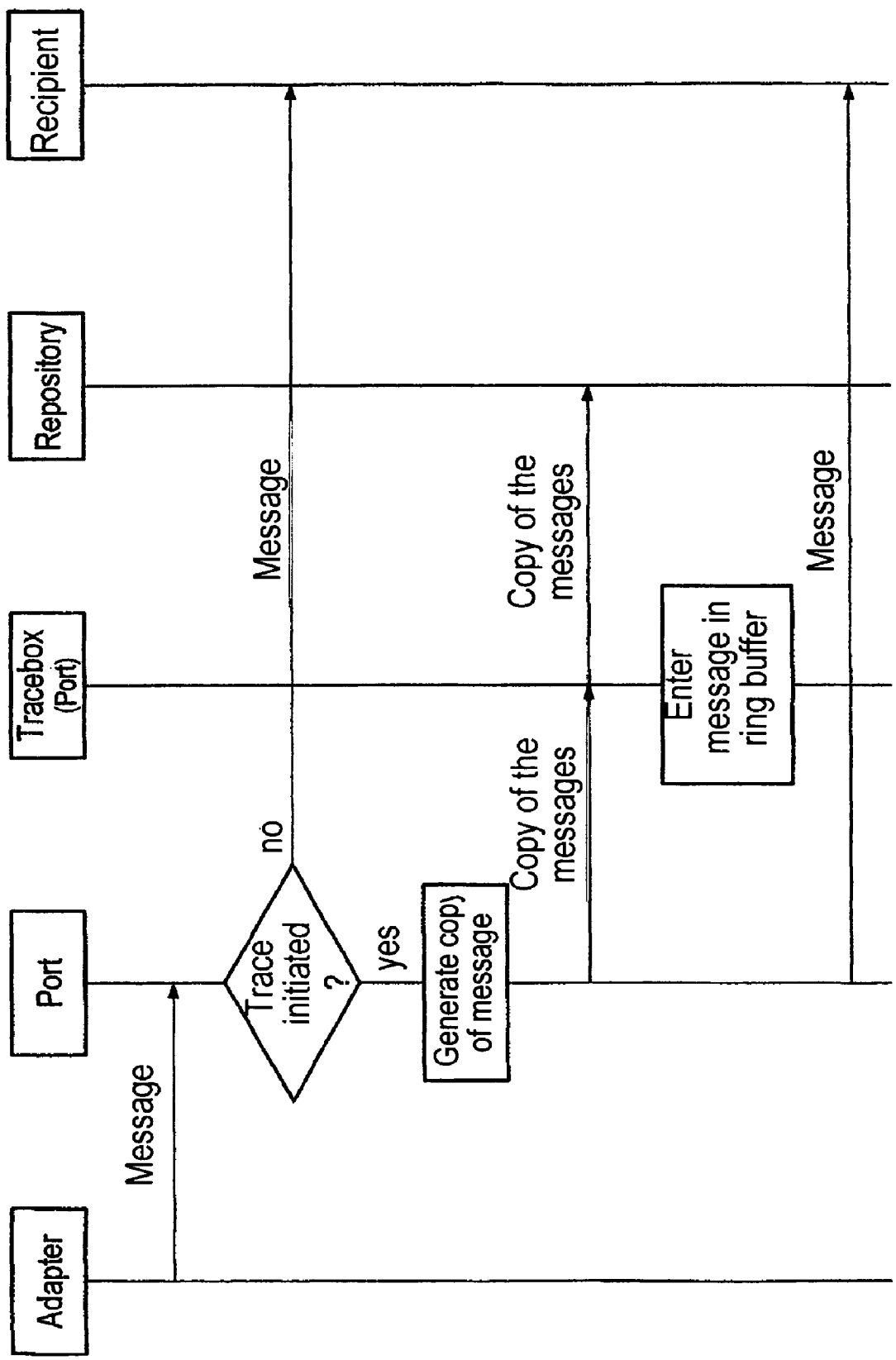
FIG. 9 shows a sequence chart: operation.

The representation according to FIG. 9 shows a sequence chart for the operation of tracing mode.

Figure 10:
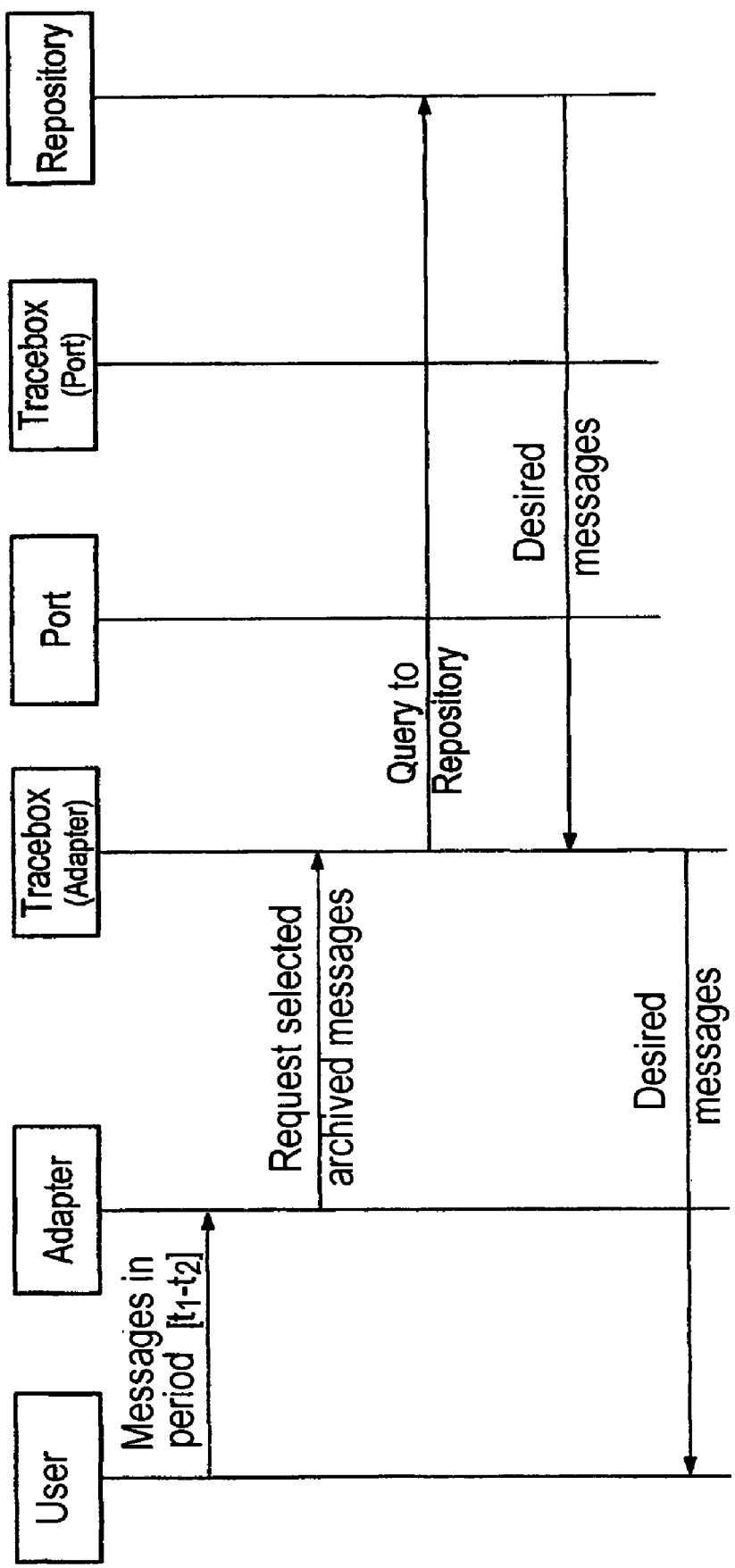
FIG. 10 shows a sequence chart: evaluation mode.

The representation according to FIG. 10 shows a sequence chart for the operation of evaluation mode.

Figure 11:
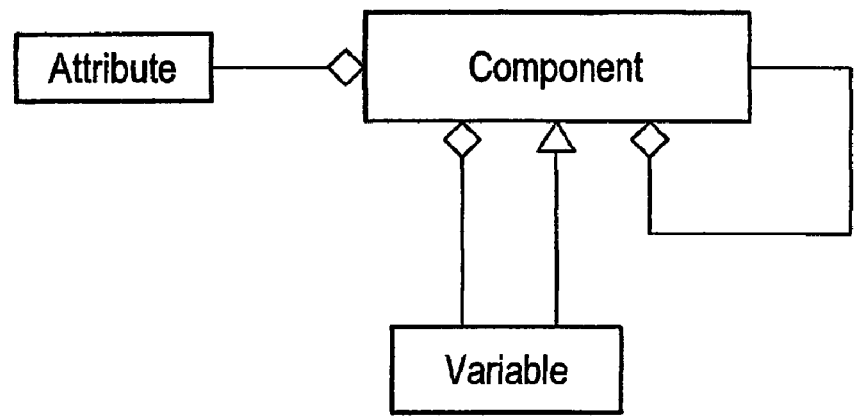
FIG. 11 shows a component as the meta-object model in UML notation.

The representation according to FIG. 11 shows the object structure of a component as a meta-object model of the framework program (IF; FIG. 2) in UML (Unified Modeling Language). With the inventive system and method, the software applications to be integrated and the underlying communication means (e.g. HTTP, MSMQ, etc.) are mapped onto an object model of the framework program (IF; FIG. 2). As a result applications that are heterogeneous per se have a shared object model. This means that all methods, data structures, objects, etc. of the external applications to be integrated are shown in a shared object model. This object model is highly generic and represents a meta-object model. The core of this object model comprises an object type known as a component. A component can in turn aggregate other components and/or contain specific types of component, known as variables, to which defined values are assigned in operation. Components and variables respectively can also have additional attributes.

This object model forms the basis for the adaptation of MES applications or other applications. This means that the structures of the applications are converted into or mapped onto structures of said object model. All the applications to be integrated are represented within the framework program (IF, FIG. 2) in the representation of said object model. The underlying communication means are also mapped onto this generic object model. All applications and all underlying communication means are now represented in a standard and homogenous object model in the framework program (IF; FIG. 2). This means that communication relations can be set up very simply and easily between the applications.

In the representation according to FIG. 11 the generic component, which represents the core of the object model, is displayed in UML notation.

The rectangular boxes represent parts of the object model. An aggregation (partly from-relation) is represented by a diamond relation, while the inheritance (in-relation) is represented by a triangle relation. The representation according to FIG. 11 therefore shows that a component can comprise a plurality of components and one component can be part of another component. The diamond relation connects a component to attributes and variables. This means that a component can contain attributes and variables. Attributes are descriptive data. All the objects of one class possess the same attributes but generally different attribute values. An attribute value is a value assigned to an attribute from its value range. A variable can assume values of defined data types (e.g. integer, real, etc.). As shown by the diamond relation, a component can contain a plurality of variables. A component can however be a higher class of a variable, as shown by the triangle relation. This means that a variable can be a derived component. The diamond and triangle relations can also contain cardinalities.

Mapping mechanisms such as adapters or wrappers for example are used to map the software applications to be integrated and the underlying communication means onto this generic object structure, i.e. component structure of the framework program (IF; FIG. 2).

Figure 12:
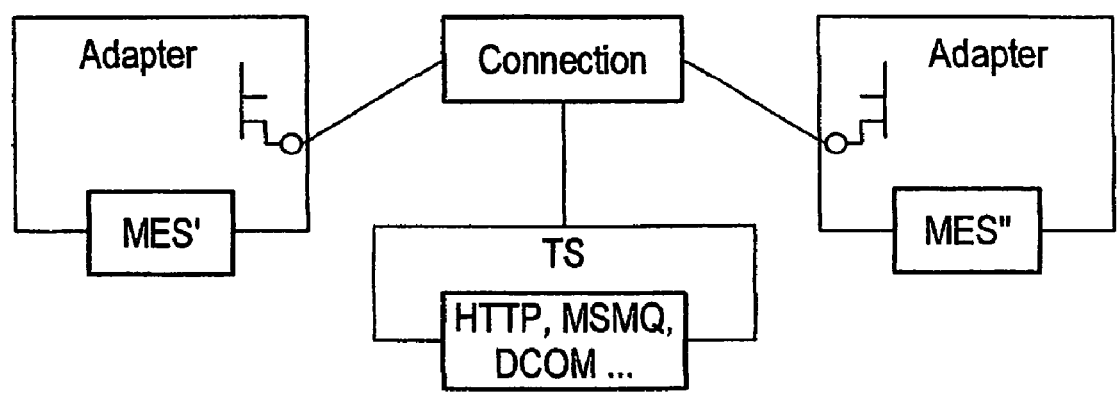
FIG. 12 shows a communication relation between MES applications and FIG. 13 shows the object structure of a connection in UML.

The representation according to FIG. 12 shows how a communication relation is set up between MES applications. As already described, the applications and underlying communication mechanisms are mapped onto a standard component structure (meta-object model of the framework program).

FIG. 12 shows how a communication connection is set up between the MES applications MES' and MES". Adapters or wrappers are used to map these MES applications MES' and MES" onto the component structure of the framework program (IF; FIG. 2). The underlying communication means (HTTP, MSMQ, DCOM, etc.) are also mapped via adapters or wrappers onto the generic object model of a component structure. These communications means are then represented by a component transport system (TS) in the framework program (IF; FIG. 2). This component transport system (TS) abstracts from the underlying communication means. When setting up a communication connection it does not matter which communication means ultimately form the physical basis. The communication means are therefore essentially interchangeable.

Figure 13:
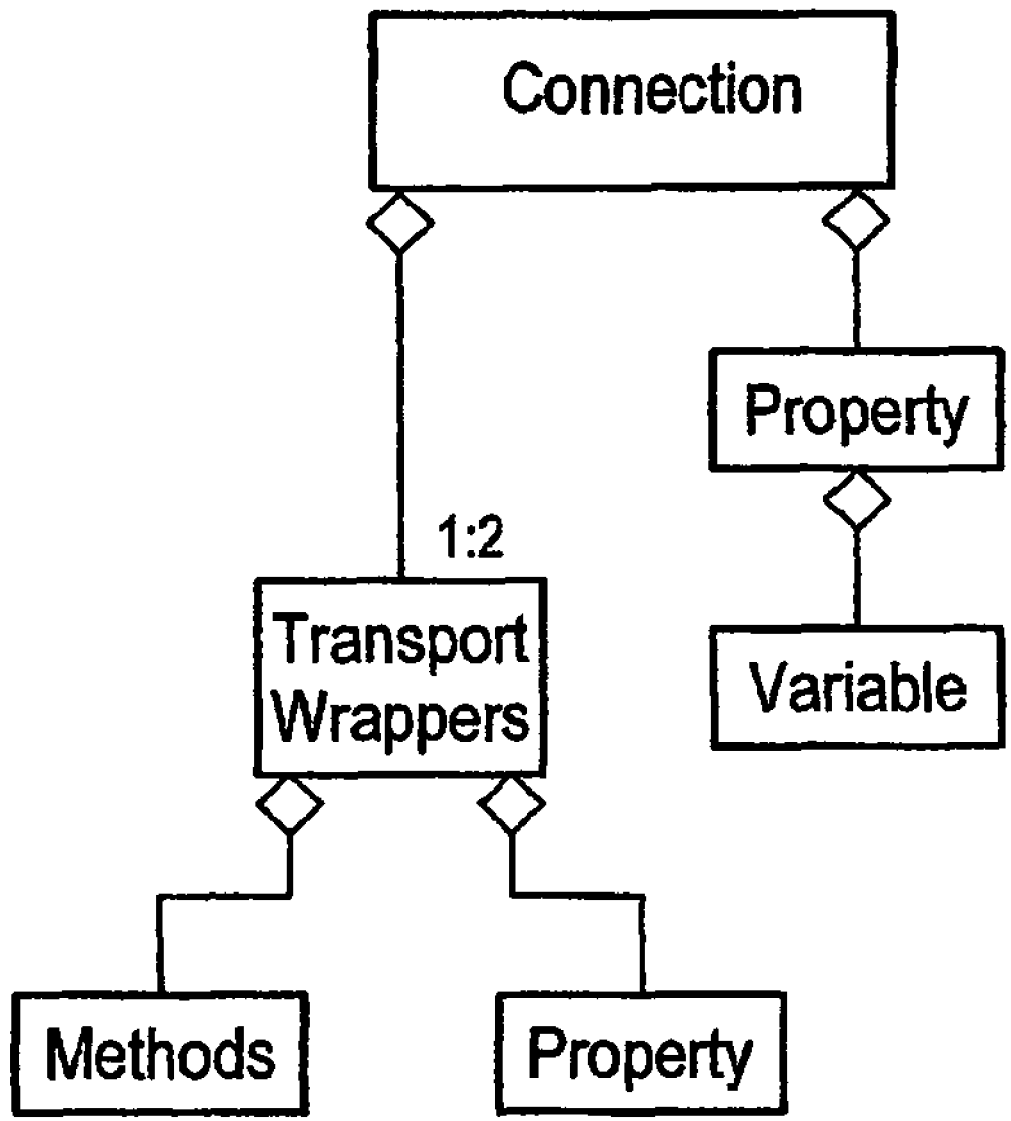

The communication relation between the MES applications MES' and MES" is established by means of what is known as a connection (see FIG. 13). A connection connects any two objects of the object model. As the connection relates to objects of the generic object model, it knows their semantics and knows which particular features have to be established during connection, i.e. method objects have to be managed differently from pure data objects for example. The connection is also based on a transport system. The transport system is also present as part of the generic object model of the framework program (IF; FIG. 2). A connection can be unidirectional or bi-directional.

The representation according to FIG. 13 shows the object structure of a connection in UML notation. A connection is a generic object that essentially comprises two parts.

On the one hand from the wrappers of the specific communication means and on the other hand from a collection of properties, which can be adjusted via said communication means. These properties and the connection itself are in turn components of the object model, whereby the properties are simply defined by a list of variables. A transport wrapper in turn also contains properties. Where MSMQ is used as the communication means, the name of the message queue used for example is such a property. The cardinality (1:2) shows that the connection from FIG. 13 contains at least one but maximum two transport wrappers. The other aggregation relations (diamond symbol), as shown in FIG. 13, can also contain cardinalities. A transport wrapper can also contain methods. For example a method for opening a specific transport channel, a method for closing a specific transport channel, a method for sending a string, a method for receiving a string, etc.

Communication means are generally mapped by means of wrappers onto the object model of the framework program but in principle it is also possible to integrate communication means in the framework program by means of adapters.

To summarize the invention relates to a system and a method for tracing and evaluating the communication of software applications, in particular MES applications in an entire system. It allows progressive or step-by-step tracing and evaluation: at project level, adapter level and port level, i.e. individual communication connections, individual applications and even the entire project is traced by (even heterogeneous) application environments. The tracing and evaluation mechanisms enable higher-level services to access the archived trace and error data online at all times. An example of one such service is the generation of a report in the pharmaceutical field, indicating the materials used and sent in production orders. Online access can be effected by means of data connections (e.g. via a Local Area Network) or via internet-type means.

The inventive system or method described above can be implemented as a computer program in languages known for this purpose. Such an implemented computer program can be stored and transported in a similarly known manner via electronic data paths or even on data media (computer program products).

The invention claimed is:

1. A system for tracing or evaluating the exchange of information between MES software applications in a MES system, comprising:
multiple heterogeneous MES software applications;
a software system configured to operate in the MES system, linking the heterogeneous software applications for exchange of data between one another by creating an object model of the applications and their communication connections; at least one computer unit for storing the software applications and the software system;
one or more link mechanisms for connecting the software applications to and integrating the software applications into the software system by mapping the API of the respective application and its communication connection to an element of the object model and a port between such model elements representing the software applications, respectively, wherein the one or more link mechanisms generates for each port: a trace box for collecting ongoing messages and an error box for collecting errors associated with messages that could not be delivered or forwarded;

a first device, connected to receive information, from the software system via the trace box, for tracing an exchange of information between the software applications;

a second device, connected to receive information, from the software system via the error box, for tracing errors occurring in the exchange of information between the software applications;

a third device connected to receive and store tracing information relating to the exchange of information and the errors via the error box and trace box; and a fourth device connected to receive and analyze the tracing information relating to the exchange of information and errors via the error box and trace box.

2. A system according to claim 1, wherein the results of the analysis of the exchange of information and/or the error analysis is further processed directly by the software system.

3. A system according to claim 1, wherein specific information and/or errors are selected by a filter.

4. A system according to claim 1, wherein tracing and/or evaluation takes place at project level or at adapter level or at the level of an information channel.

5. A system according to claim 1, wherein a adapter and/or a wrapper are deployed as the link mechanism.

6. A system according to claim 1, wherein the first and second devices are realized by one device or the first, second and fourth devices are realized by one device, or the first and fourth devices are realized by one device or the second and fourth devices are realized by one device.

7. A system according to claim 1, wherein the third device is integrated into one of the other devices.

8. A method for tracing and/or evaluating the exchange of information between MES software applications in an MES system, comprising:

integrating the software applications in a software system of the MES system, wherein the software applications and the software system are stored on at least one computer unit;

connecting the software applications to the software system by a link mechanism by mapping the API of the respective application and its communication connection to an element of the object model and a port between such model elements representing the software applications, respectively, wherein the one or more link mechanisms generates for each port: a trace box for collecting ongoing messages and an error box for collecting errors associated with messages that could not be delivered or forwarded where the link mechanism either provides functionality to start, control and process a software program, or converts an API of an application to be integrated to language, nomenclature and object world of the software system;

tracing the exchange of information between the software applications by a first device via the trace box;

tracing errors occurring in the exchange of information by a second device via the error box;

storing the exchange of information and the errors by a third device via the error box and trace box; and analyzing the exchange of information and/or the errors by a fourth device via the error box and trace box.

9. A method according to claim 8, wherein the software applications are heterogeneous.

10. A method according to claim 8, wherein the results of the analysis of the exchange of information and/or the error analysis are further processed directly by the software system.

11. A method according to claim 8, wherein specific information and/or errors are selected by a filter.

12. A method according to claim 8, wherein tracing and/or evaluation takes place at project level or at adapter level or at the level of an information channel.

13. A method according to claim 8, wherein a adapter and/or wrapper are deployed as the link mechanism.

14. A non-transitory data medium, which comprises a computer program to implement a method for tracing and/or evaluating the exchange of information between software applications in a MES system, the method comprising:

providing a plurality of MES software applications;

linking the MES software applications in a software system of the MES system, wherein the software applications and the software system are stored on at least one computer unit;

connecting the software applications to the software system by a link mechanism by mapping the API of the respective application and its communication connection to an element of the object model and a port between such model elements representing the software applications, respectively, wherein the one or more link mechanisms generates for each port: a trace box for collecting ongoing messages and an error box for collecting errors associated with messages that could not be delivered or forwarded;

tracing the exchange of information between the software applications by a first device via the trace box;

tracing errors occurring in the exchange of information by a second device via the error box;

storing the exchange of information and the errors by a third device via the error box and trace box; and analyzing the exchange of information and/or the errors by a fourth device via the error box and trace box.

15. The system of claim 1 wherein the first device is connected through a first link mechanism to receive information from the software system and the second device is connected through the first or another link mechanism to receive information from the software system.

16. The system of claim 1 wherein one of the link mechanisms provides functionality to start, control and process a software program.

17. The system of claim 1 wherein one of the link mechanisms converts an API of an application to be integrated to language, nomenclature and object world of the system.

* * * * *